Patented July 3, 1945

2,379,670

UNITED STATES PATENT OFFICE 2,379,670

REMOVAL OF ACETYLENE FROM GASES

Charles E. Welling and Harold J. Hepp, Bartlesville, Okla., assignors to Phillips Petroleum Company, a corporation of Delaware No Drawing. Application January 24, 1942, Serial No. 428,120

3 Claims. (Cl. 260—677)

This invention relates to the removal of acetylene from gases.

When mixtures of hydrocarbons are processed by thermal or catalytic treatment to produce more valuable materials or are treated in some other fashion, it often happens that the presence of even minute quantities of acetylene will give rise to objectionable side reactions or to deposition of carbon. In consequence it is sometimes desirable to treat such mixtures in such a fashion as to remove the acetylene without destroying valuable components of the mixtures.

It is already known that acetylene may be removed from gases containing it by passing the gases over bauxite or over the usual hydrogenation catalysts such as reduced nickel. With gases containing hydrogen and certain unsaturated hydrocarbons, undesirable reactions may occur over these catalysts in addition to the conversion of acetylene. Furthermore, such catalysts may present special problems in manufacture and handling due to lack of mechanical strength, need for supporting the active catalytic material on an inert carrier, difficulty in preparing a catalyst of uniform composition and activity, and the like.

We have now found that by leading hydrocarbon gases containing acetylene and hydrogen at elevated temperatures in the range 100 to 400° C. over catalysts comprising alloys whose major constituents are iron, chromium and nickel the acetylene may be very greatly reduced in amount or practically quantitatively removed without materially altering other hydrocarbon components. Said alloys may or may not contain minor amounts of such substances as carbon, silicon, phosphorus and the like and may or may not contain small amounts of substances of the type of stabilizing agents for steels such as titanium, columbium, molybdenum and the like.

Since the catalysts are metallic in nature, they may be utilized in a large number of mechanical shapes and forms. Thus the catalysts may be in the form of turnings, borings, chips and the like or may be used in such forms as wire, sheets, or plates, pipes and tubes and the like.

The alloys used as catalysts in our process may be composed of chromium in weight per cent ranging from about 5 to about 30, nickel from zero to about 20 weight per cent, and iron as the third major ingredient. A preferred catalyst composition is one containing chromium, nickel and iron in about the weight ratio of 18:8:74.

We may carry out our process at any suitable pressure. A preferred pressure range would be about 400 to 1000 lbs. per sq. in. gauge.

Suitable temperatures for operating our process are in the range 100 to 450° C., and the exact temperature to be used in a particular application of our process will be determined by such factors as flow velocity of the gas over the catalyst and composition of the gas being treated, permissible acetylene content of the treated gas, previous use of the catalyst and the like.

The alloy catalysts according to our invention are relatively immune to sulfur poisoning and in fact minute quantities of sulfur, of the order of a few thousandths of one per cent in the gases to be treated, may render the catalyst more selective in its action upon the acetylene present and hence such amounts of sulfur may be desirable in the form of hydrogen sulfide, mercaptans or the like. The presence of appreciable amounts of sulfur in the gases to be treated may require some increase in the temperature of the catalyst within the range already specified.

After a period of use the alloy catalysts according to our invention may lose activity and can be regenerated by burning out in an oxygen-bearing gas stream. After burning the carbonaceous residues, it may be desirable to treat the catalysts with a gas containing hydrogen at temperatures in the range 100-600° C.; however, such treatment may sometimes be omitted when the gas to be subsequently treated to remove acetylene contains substantial amounts of hydrogen.

The following examples represent certain specific embodiments of our process. Example 1, in which no catalyst was used, is cited merely to show that very little acetylene can be reacted without a catalyst under the conditions of temperature and pressure that are comprehended in our catalytic process. The examples are not to be construed as unnecessarily limiting the invention.

*Example 1*

A synthetic gas mixture containing about 24 per cent hydrogen, 74 per cent ethylene plus propylene, 0.8% acetylene and small amounts of paraffins was passed through a heated quartz tube. At tube temperatures of 300 to 325° C., a pressure of 735 to 745 lbs. per sq. in. and a space velocity of 90 to 260, from 85 to 91 per cent of the acetylene survived and was found in the effluent gas.

*Example 2*

Fifteen cubic centimeters of small turnings of a commercial 16 per cent chrome iron were used as catalyst and were contained in a catalyst tube of the same material. The catalyst had been used in previous tests and had twice been reactivated by burning out with air. A synthetic gas mixture containing about 24 per cent hydrogen, 74.5 per cent ethylene plus proplyene, 0.98 per cent acetylene, 0.013 per cent hydrogen sulphide, and small amounts of paraffinic constituents was passed at 720 to 750 lbs. per sq. in. gauge pressure over the catalyst at a rate of 45.3 liters per hour (measured at atmospheric temperature and pressure). With the catalyst maintained at a temperature between 340 and 350° C., a sample of effluent gas was taken during the fourteenth hour of operation and the acetylene content was found to have been reduced to 0.06 per cent acetylene. There was no concurrent destruction of olefins.

Example 3

Fifteen cubic centimeters of small turnings of a commercial 25 per cent chrome, 12 per cent nickel steel were used as a catalyst and were contained in a catalyst tube of the same material. The catalyst had been used in previous tests and had twice been reactivated by burning out with air at 450 to 500° C. A synthetic gas mixture containing about 24 per cent hydrogen, 73.6 per cent ethylene plus propylene, 0.68 per cent acetylene, 0.006 per cent hydrogen sulfide and small amounts of paraffinic constituents was passed at 750 to 760 lbs. per sq. in. gauge pressure over the catalyst at a rate of 48.4 liters per hour (measured at atmospheric pressure and temperature). With the catalyst maintained at a temperature between 320 and 325° C., a sample of effluent gas was taken during the eighth hour of operation and the acetylene content was found to have been reduced to 0.37 per cent acetylene. Less than one-half per cent of olefins were destroyed in thus treating the gas mixture.

Example 4

Fifteen cubic centimeters of small turnings of a commercial 18 per cent chrome, 8 per cent nickel steel were used as a catalyst and were contained in a catalyst tube of the same material. The catalyst had been burned off with air at temperatures up to 600° C. before use. A synthetic gas mixture containing about 23 per cent hydrogen, 75.4 per cent propylene plus ethylene, 0.51 per cent acetylene, 0.006 per cent hydrogen sulfide and small amounts of paraffinic constituents was passed at a pressure of 750 lbs. per sq. in. gauge over the catalyst at a rate of about 45 liters per hour of gas measured at atmospheric pressure and temperature. With the catalyst maintained at a temperature of 290° C. a sample of effluent gas was taken during the eleventh hour of operation and the acetylene content was found to have been reduced to less than 0.01 per cent acetylene. No concurrent hydrogenation of olefins was detectable.

Example 5

Using the same catalyst, charge stock and flow rate that were described in Example 4, at a catalyst temperature of 275° C. and 400 lbs. per sq. in. gauge pressure, the acetylene content in the effluent gas was found to have been reduced to 0.01 per cent acetylene. No concurrent hydrogenation of olefins was detectable.

Example 6

A synthetic gas mixture containing about 23 per cent hydrogen, 75.3 per cent propylene plus ethylene, 0.93 per cent acetylene and small amounts of paraffinic impurities was passed at 720 lbs. per sq. in. gauge pressure over the catalyst of Example 5. This catalyst had been given an intervening burning off with air and reduction with hydrogen. The acetylene-bearing gas mixture was passed over the catalyst at a temperature of 160° C. and flow rate of 40.5 liters per hour of gas measured at atmospheric pressure and temperature. A sample of effluent gas contained less than 0.05 per cent acetylene. No concurrent hydrogenation of olefins was detectable.

Our invention applies particularly to the removal of acetylenes from gases formed by the high-temperature, low-pressure pyrolyses of low-boiling hydrocarbons. In such cases the gases contain sufficient hydrogen for treatment in accordance with our invention, but in the treatment of gases of similar composition but deficient in hydrogen, hydrogen from an outside source may, of course, be added in such amounts as may be found necessary for any particular case. Our invention particularly applies to olefin-containing gases where the olefin content exceeds the acetylene content, particularly to gases containing 5% or less of acetylenes, and will find particular use in the treatment of gases containing no more than 1% of acetylenes.

We claim:

1. A process for treating a normally gaseous mixture containing olefins, free hydrogen and a minor amount of acetylene to hydrogenate said acetylene without appreciable hydrogenation of said olefins, which comprises passing said mixture at a temperature between 100 and 400° C. under a superatmospheric pressure into contact with a steel of large surface containing between 16 and 25 per cent chromium and not more than about 12 per cent nickel for a time sufficient to effect substantially complete removal of said acetylene, said olefins remaining substantially unreacted.

2. The process of claim 1 in which said gaseous mixture contains not more than 1% of acetylene.

3. A process for the selective removal of acetylene from a normally gaseous mixture containing substantial amounts of free hydrogen and olefins and acetylene in an amount less than that of said olefins and not greater than about 5 per cent of said mixture, without appreciable decrease in the olefin content, which comprises contacting said mixture at a temperature between about 100 and about 400° C. and a pressure between about 400 and about 1000 pounds per square inch with a catalytic agent consisting of an alloy of chromium, nickel and iron in a weight ratio of about 18:8:74 and in a physical form having a large surface for a time sufficient to effect substantially complete conversion of acetylene and such as to effect substantially no conversion of said olefins.

CHARLES E. WELLING.
HAROLD J. HEPP.